(No Model.) 2 Sheets—Sheet 1.

G. F. JAISLE.
SPRINKLING APPARATUS.

No. 361,293. Patented Apr. 19, 1887.

Witnesses:
W. C. Jirdinston.
C. D. Kerr.

Inventor
George F. Jaisle
by
Attorney.

(No Model.) 2 Sheets—Sheet 2.
G. F. JAISLE.
SPRINKLING APPARATUS.
No. 361,293. Patented Apr. 19, 1887.
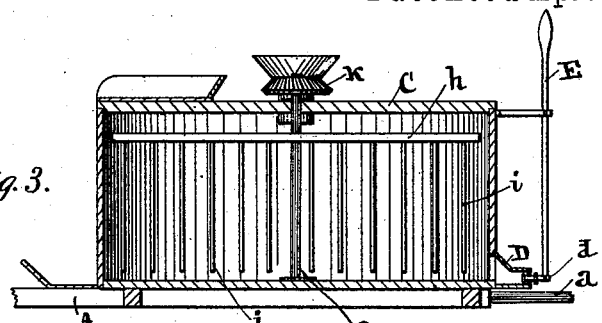
Fig. 3.
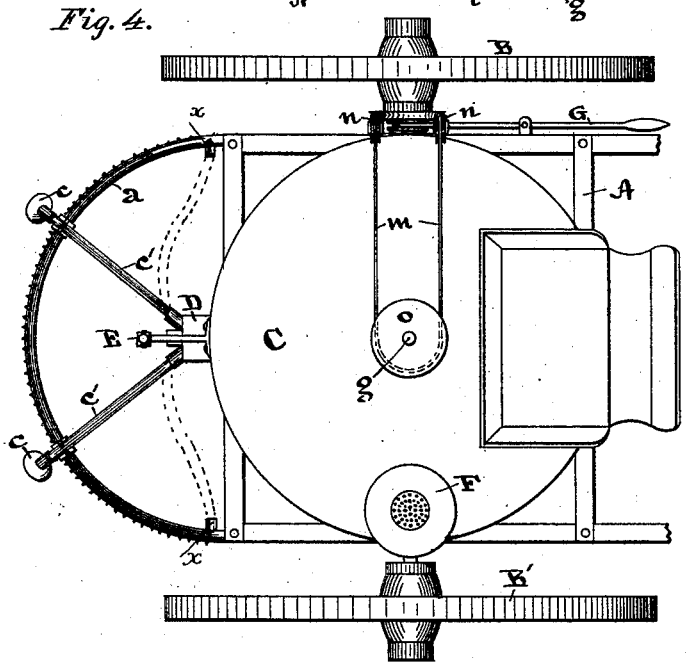
Fig. 4.
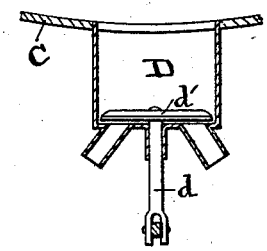
Fig. 8.
Fig. 9.
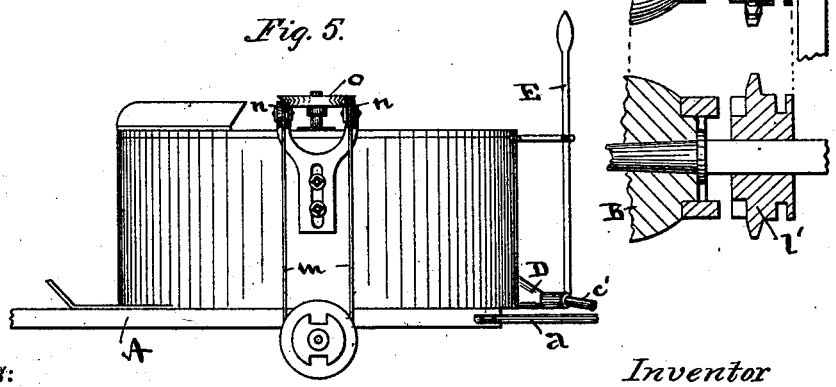
Fig. 5.
Witnesses:
W. C. Jirdinston.
Inventor
George F. Jaisle
by ⸺ Hosea
Attorney.

UNITED STATES PATENT OFFICE.

GEORGE F. JAISLE, OF CINCINNATI, OHIO.

SPRINKLING APPARATUS.

SPECIFICATION forming part of Letters Patent No. 361,293, dated April 19, 1887.

Application filed June 26, 1886. Serial No. 206,312. (No model.)

*To all whom it may concern:*

Be it known that I, GEORGE F. JAISLE, a citizen of the United States, residing at Cincinnati, Ohio, have invented new and useful Improvements in Sprinkling Apparatus, of which the following is a specification.

My invention relates, primarily, to devices for distributing medicated liquids upon growing crops for the destruction of noxious insects—such, for example, as the "Colorado beetle"—its object being to provide a vehicle for transporting and distributing the liquid, embodying suitable stirring and mixing devices, operating-gear, valves, and nozzle-adjusting mechanism, and certain details of construction and arrangement of these and other parts, contributing to constitute a cheap, efficient, and convenient apparatus capable of use upon farms and gardens for this and kindred purposes.

Mechanism embodying my invention is illustrated in the accompanying drawings, in which—

Figure 1:
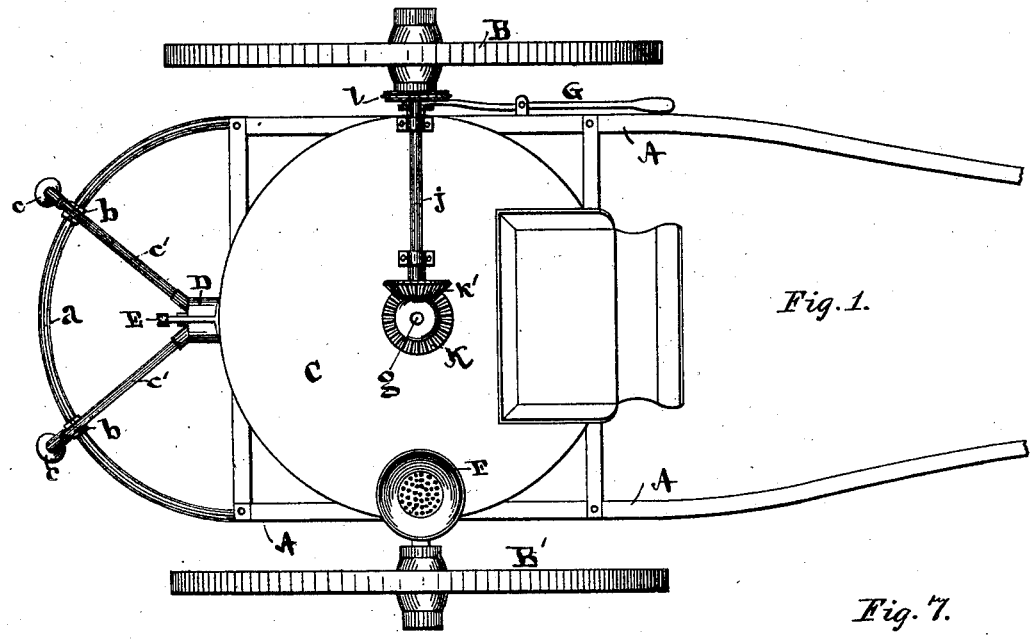
Figure 6:
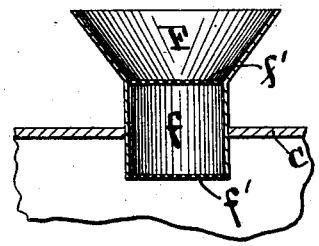
Figure 7:
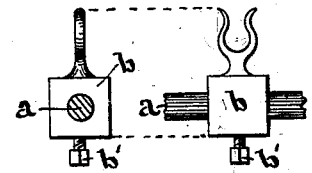
Figure 2:
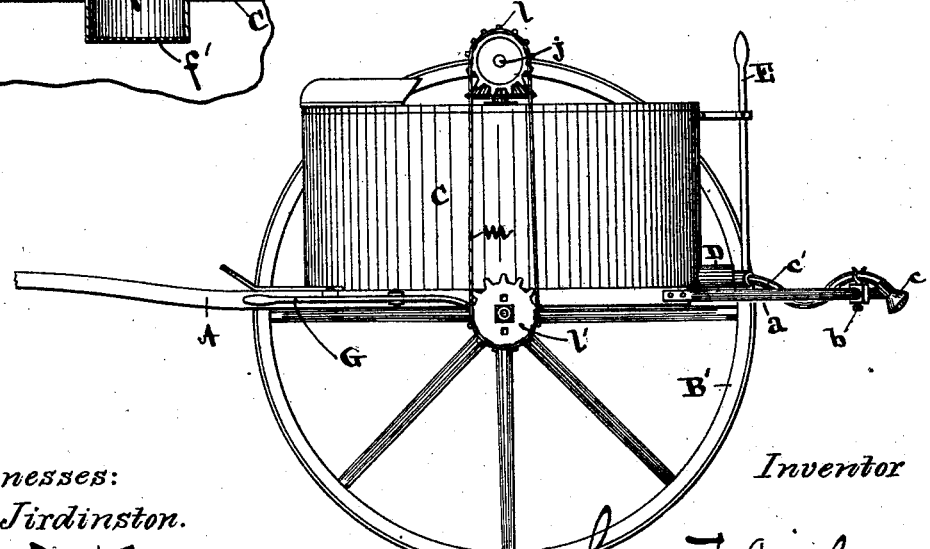

Figures 1 and 4 are plan views of the apparatus complete, the latter figure embodying a modified form of the driving-connections for the stirring mechanism; Fig. 2, a side elevation of the apparatus exhibited in Fig. 1, omitting one bearing-wheel for clearness of illustration of the remaining parts; Fig. 3, a sectional elevation of the containing-tank, showing the interior stirring apparatus; Fig. 5, a side elevation of the tank, further exhibiting the modified form of driving apparatus shown in Fig. 4; Fig. 6, a detail section of the filling-funnel and connected parts; Fig. 7, detail views of the adjustable clamps for supporting the discharge-sprinklers in position; Fig. 8, a horizontal section of the main discharge-nozzle and controlling-valve; Fig. 9, detail view and section of the shifting sprocket-wheel and clutch mechanism.

Same letters are used to designate similar parts throughout.

Referring now to the drawings, A designates the supporting-frame including the shafts (where horse-power is employed;) B B', the bearing-wheels; and C, a tank, preferably of shallow cylindrical form, and having its axis vertically arranged upon the supporting-frame between the wheels. The driver's seat may be arranged upon the tank, as shown.

The rear of the supporting-frame is semicircular, forming a support, $a$, for the distributing-nozzles, as hereinafter described. It may be a pipe perforated for use as an ordinary distributing-sprinkler, or a similarly-formed sprinkler may be attached below it for the use of the vehicle as an ordinary sprinkling-cart when and if desired—suitable hose-connection in such case being made with the tank.

The primary use of the support $a$ is, however, to maintain in adjustable positions one or more holding-clamps, $b$, provided with set-screws $b'$, or other means of retention, by which they may be secured at any suitable positions for the discharge-nozzle $c$. The clamps consist of a perforated block adapted to fit adjustably upon the bar $a$ and be secured thereon by set-screws $b'$, and two jaws projecting above between which the discharge-nozzle $c$ is placed. Thus the adjustment of the clamps upon the bar $a$ determines the position of the discharge-nozzles $c$. In the present illustration of my invention I have shown two of these nozzles $c$, which are the ordinary "rose" sprinklers connected by flexible hose-connections $c'$, with the main distributing-nozzle D of the tank. The nozzle proper, D, is a somewhat-enlarged box, opening at one end into the tank and terminating at the other in two lateral branches connecting with the hose $c'$ $c'$, with a projecting valve-stem, $d$, entering between them, and carrying a valve, $d'$, faced with rubber or leather, covering the openings of both branches. The construction shown is preferable for use with the sedimentary liquids employed for medicating plants.

When the apparatus is to be used for ordinary sprinkling purposes, one or both of the hose-connections $c'$ may be connected with the sprinkler by the connection pipe or pipes X, to convey water thereto from the tank.

To the valve-stem $d$ is attached exteriorly an operating-lever, E, pivoted to a bracket upon the tank; or any other suitable means of operation may be employed. I also attach to the tank a filling-funnel, F, provided with a cylindrical extension, $f$, having two strainers, $f'$ $f'$, between which, in filling the tank, is placed the medicament employed, so that the inflowing water dissolves and disintegrates the material as it passes into the tank, thus preventing the formation of lumps or the passage of large particles, which otherwise would pass into the tank and thence obstruct the distributer.

As the material—such, for example, as "paris-green" often used for the purpose indicated—is only partially, if at all, soluble, the method of distribution to plants heretofore employed in watering-cans and the like is defective in the want of uniformity in the strength and proportions of the mixture or solution. To overcome this difficulty and maintain a uniform distribution of the medicament, I provide stirring and mixing devices constructed and arranged as follows: In the vertical axis of the tank I arrange a shaft, $g$, stepped in an open socket-bearing at the bottom of the tank, and extending thence through and having a bearing in the top of the tank. Upon this shaft within the tank is mounted one or more horizontal arms $h$, having depending stirrers $i$ attached so that by the rotation of the shaft $g$ the liquid and sedimentary contents of the tank are continually agitated, motive power being supplied from the rotating bearing-wheels of the vehicle.

As a preferred arrangement of devices for communicating the required rotation to the shaft $g$ and its strring-arms, I have shown a counter-shaft, $j$, mounted in bearings upon the top of the tank, having a bevel-gear connection, $k\ k'$, at one end with the vertical shaft $g$, and a chain-and-sprocket-wheel connection, $l\ m$, at the other, with a shifting sprocket-wheel, $l'$, adjacent to and having a clutch connection with the hub of one of the bearing-wheels, B.

The sprocket-wheel $l'$ has a grooved collar, by which it is held and shifted along the axle of the vehicle into and out of connection with the wheel-hub by a shifting-yoke and lever, G, a suitably-projecting collar being secured to the wheel-hub to engage the recesses in the face of the sprocket-wheel. I have also shown, as a modified form of devices for communicating power to the stirrers, a simple belt or chain, $m$, engaging directly upon the wheel-hub, or a grooved pulley or collar attached thereto, passing thence over idler-rollers $n\ n$, attached upon the side or top of the tank, and around a belt-pulley, $o$, secured upon the projecting end of the shaft $g$. In such case no shifting or detaching devices are required, as the connection may at any time be discontinued by slipping the belt $m$ from its engagement at either end.

I prefer the first-described arrangement, because of its certainty of action and requiring no special care to maintain it in an operative condition.

The machine as illustrated is designed to "track" at the outside of two contiguous rows—for example, of potatoes—the draft-horse passing between the rows. In such case the nozzles are adjusted to proper position to discharge upon the two rows simultaneously, and by means of suitable supports two additional nozzles and hose-connections could be arranged to discharge upon the two outside rows of plants, thus treating four rows simultaneously; but ordinarily, as the vehicle is to travel over soft ground, it would not be desirable to carry a tank of such size as to contain the amount and weight of water required for so extensive a use. If but one row is to be treated, one of the hose and nozzles $c\ c'$ can be triced up, so that the nozzle shall be above the level of liquid in the tank, and thus be rendered inoperative.

I claim as my invention and desire to secure by Letters Patent of the United States—

The herein-described sprinkling apparatus, consisting of a wheeled frame, the tank C, provided at the rear with a nozzle, D, having diverging branches, and a valve to control the same, a curved support, $a$, attached to the rear of the wheeled frame, bifurcated clamps $b$, adjustably mounted on said support, and the flexible hose-tubes $c'\ c'$, connected with the diverging branches of the nozzle D and supported in the bifurcated clamps, each hose-tube being provided at its outer end with a sprinkling-rose, $c$, substantially as described.

In testimony whereof I have hereunto set my hand in the presence of two subscribing witnesses.

GEORGE F. JAISLE.

Witnesses:
L. M. HOSEA,
C. D. KERR.